(12) United States Patent
Wolrich et al.

(10) Patent No.: US 7,181,573 B2
(45) Date of Patent: Feb. 20, 2007

(54) QUEUE ARRAY CACHING IN NETWORK DEVICES

(75) Inventors: Gilbert Wolrich, Framingham, MA (US); Mark B. Rosenbluth, Uxbridge, MA (US); Debra Bernstein, Sudbury, MA (US)

(73) Assignee: Intel Corporation, Santa Clara, CA (US)

( * ) Notice: Subject to any disclaimer, the term of this patent is extended or adjusted under 35 U.S.C. 154(b) by 82 days.

(21) Appl. No.: 10/041,678

(22) Filed: Jan. 7, 2002

(65) Prior Publication Data

US 2003/0131198 A1 Jul. 10, 2003

(51) Int. Cl.
*G06F 12/00* (2006.01)

(52) U.S. Cl. .................. 711/136; 710/54; 710/310; 711/129; 711/170

(58) Field of Classification Search .............. 365/49; 710/39, 54, 310; 709/106, 229; 711/108, 711/121, 128, 130, 136, 140, 141, 160, 170
See application file for complete search history.

(56) References Cited

U.S. PATENT DOCUMENTS

| | | | |
|---|---|---|---|
| 3,373,408 A | 3/1968 | Ling | |
| 3,478,322 A | 11/1969 | Evans | |
| 3,792,441 A | 2/1974 | Wymore et al. | |
| 3,940,745 A | 2/1976 | Sajeva | |
| 4,130,890 A | 12/1978 | Adam | |
| 4,400,770 A | 8/1983 | Chan et al. | |
| 4,514,807 A | 4/1985 | Nogi | |
| 4,523,272 A | 6/1985 | Fukunaga et al. | |
| 4,745,544 A | 5/1988 | Renner et al. | |
| 4,866,664 A | 9/1989 | Burkhardt, Jr. et al. | |
| 5,140,685 A | 8/1992 | Sipple et al. | |
| 5,142,683 A | 8/1992 | Burkhardt, Jr. et al. | |

(Continued)

FOREIGN PATENT DOCUMENTS

| | | |
|---|---|---|
| AU | WO 03/017541 | 2/2003 |
| EP | 0 379 709 | 8/1990 |
| EP | 0 418 447 | 3/1991 |
| EP | 0 464 715 | 1/1992 |
| EP | 0 633 678 | 1/1995 |
| EP | 0 745 933 | 12/1996 |
| EP | 0 760 501 | 3/1997 |
| EP | 0 809 180 | 11/1997 |
| JP | 59111533 | 6/1984 |
| WO | WO 94/15287 | 7/1994 |
| WO | WO 97/38372 | 10/1997 |
| WO | WO 98/25210 | 6/1998 |
| WO | WO 01/15718 | 3/2001 |
| WO | WO 01/16769 | 3/2001 |
| WO | WO 01/16770 | 3/2001 |
| WO | WO 01/16782 | 3/2001 |
| WO | WO 01/48596 | 7/2001 |
| WO | WO 01/48606 | 7/2001 |
| WO | WO 01/48619 | 7/2001 |
| WO | WO 01/50247 | 7/2001 |
| WO | WO 01/50679 | 7/2001 |

OTHER PUBLICATIONS

U.S. Appl. No. 09/473,571, filed Dec. 28, 1999, Wolrich et al.

(Continued)

*Primary Examiner*—B. James Peikari
(74) *Attorney, Agent, or Firm*—Fish & Richardson P.C.

(57) ABSTRACT

In response to receiving a request to perform an enqueue or dequeue operation a corresponding queue descriptor specifying the structure of the queue is referenced to execute the operation. The queue descriptor is stored in a processor's memory controller logic.

30 Claims, 4 Drawing Sheets

U.S. PATENT DOCUMENTS

| | | |
|---|---|---|
| 5,155,831 A | 10/1992 | Emma et al. |
| 5,155,854 A | 10/1992 | Flynn et al. |
| 5,168,555 A | 12/1992 | Byers et al. |
| 5,173,897 A | 12/1992 | Schrodi et al. |
| 5,185,861 A * | 2/1993 | Valencia .................... 711/120 |
| 5,255,239 A | 10/1993 | Taborn et al. |
| 5,263,169 A | 11/1993 | Genusov et al. |
| 5,268,900 A | 12/1993 | Hluchyj et al. |
| 5,347,648 A | 9/1994 | Stamm et al. |
| 5,367,678 A | 11/1994 | Lee et al. |
| 5,390,329 A | 2/1995 | Gaertner et al. |
| 5,392,391 A | 2/1995 | Caulk, Jr. et al. |
| 5,392,411 A | 2/1995 | Ozaki |
| 5,392,412 A | 2/1995 | McKenna |
| 5,404,464 A | 4/1995 | Bennett |
| 5,404,482 A | 4/1995 | Stamm et al. |
| 5,432,918 A | 7/1995 | Stamm |
| 5,448,702 A | 9/1995 | Garcia, Jr. et al. |
| 5,450,351 A | 9/1995 | Heddes |
| 5,452,437 A | 9/1995 | Richey et al. |
| 5,459,842 A | 10/1995 | Begun et al. |
| 5,463,625 A | 10/1995 | Yasrebi |
| 5,467,452 A | 11/1995 | Blum et al. |
| 5,517,648 A | 5/1996 | Bertone et al. |
| 5,542,070 A | 7/1996 | LeBlanc et al. |
| 5,542,088 A | 7/1996 | Jennings, Jr. et al. |
| 5,544,236 A | 8/1996 | Andruska et al. |
| 5,550,816 A | 8/1996 | Hardwick et al. |
| 5,557,766 A | 9/1996 | Takiguchi et al. |
| 5,568,617 A | 10/1996 | Kametani |
| 5,574,922 A | 11/1996 | James |
| 5,592,622 A | 1/1997 | Isfeld et al. |
| 5,613,071 A | 3/1997 | Rankin et al. |
| 5,613,136 A | 3/1997 | Casavant et al. |
| 5,623,489 A | 4/1997 | Cotton et al. |
| 5,627,829 A | 5/1997 | Gleeson et al. |
| 5,630,130 A | 5/1997 | Perotto et al. |
| 5,634,015 A * | 5/1997 | Chang et al. .............. 710/310 |
| 5,644,623 A | 7/1997 | Gulledge |
| 5,649,092 A | 7/1997 | Price, deceased et al. |
| 5,649,157 A | 7/1997 | Williams |
| 5,659,687 A | 8/1997 | Kim et al. |
| 5,671,446 A | 9/1997 | Rakity et al. |
| 5,680,641 A | 10/1997 | Sidman |
| 5,684,962 A | 11/1997 | Black et al. |
| 5,689,566 A | 11/1997 | Nguyen |
| 5,699,537 A | 12/1997 | Sharangpani et al. |
| 5,717,898 A | 2/1998 | Kagan et al. |
| 5,721,870 A | 2/1998 | Matsumoto |
| 5,742,587 A | 4/1998 | Zornig et al. |
| 5,742,782 A | 4/1998 | Ito et al. |
| 5,742,822 A | 4/1998 | Motomura |
| 5,745,913 A | 4/1998 | Pattin et al. |
| 5,751,987 A | 5/1998 | Mahant-Shetti et al. |
| 5,761,507 A | 6/1998 | Govett |
| 5,761,522 A | 6/1998 | Hisanaga et al. |
| 5,781,774 A | 7/1998 | Krick |
| 5,784,649 A | 7/1998 | Begur et al. |
| 5,784,712 A | 7/1998 | Byers et al. |
| 5,796,413 A | 8/1998 | Shipp et al. |
| 5,797,043 A | 8/1998 | Lewis et al. |
| 5,809,235 A | 9/1998 | Sharma et al. |
| 5,809,530 A | 9/1998 | Samra et al. |
| 5,812,868 A | 9/1998 | Moyer et al. |
| 5,828,746 A | 10/1998 | Ardon |
| 5,828,863 A | 10/1998 | Barrett et al. |
| 5,832,215 A | 11/1998 | Kato et al. |
| 5,835,755 A | 11/1998 | Stellwagen, Jr. |
| 5,850,395 A | 12/1998 | Hauser et al. |
| 5,854,922 A | 12/1998 | Gravenstein et al. |
| 5,860,158 A | 1/1999 | Pai et al. |
| 5,872,769 A | 2/1999 | Caldara et al. |
| 5,873,089 A | 2/1999 | Regache |
| 5,886,992 A | 3/1999 | Raatikainen et al. |
| 5,887,134 A | 3/1999 | Ebrahim |
| 5,890,208 A | 3/1999 | Kwon |
| 5,892,979 A | 4/1999 | Shiraki et al. |
| 5,893,162 A | 4/1999 | Lau et al. |
| 5,905,876 A | 5/1999 | Pawlowski et al. |
| 5,905,889 A | 5/1999 | Wilhelm, Jr. |
| 5,915,123 A | 6/1999 | Mirsky et al. |
| 5,937,187 A | 8/1999 | Kosche et al. |
| 5,938,736 A | 8/1999 | Muller et al. |
| 5,940,612 A | 8/1999 | Brady et al. |
| 5,940,866 A | 8/1999 | Chisholm et al. |
| 5,946,487 A | 8/1999 | Dangelo |
| 5,948,081 A | 9/1999 | Foster |
| 5,958,031 A | 9/1999 | Kim |
| 5,961,628 A | 10/1999 | Nguyen et al. |
| 5,970,013 A | 10/1999 | Fischer et al. |
| 5,974,518 A | 10/1999 | Nogradi |
| 5,978,838 A | 11/1999 | Mohamed et al. |
| 5,983,274 A | 11/1999 | Hyder et al. |
| 6,012,151 A | 1/2000 | Mano |
| 6,014,729 A | 1/2000 | Lannan et al. |
| 6,023,742 A | 2/2000 | Ebeling et al. |
| 6,058,168 A | 5/2000 | Braband |
| 6,067,585 A | 5/2000 | Hoang |
| 6,070,231 A | 5/2000 | Ottinger |
| 6,072,781 A | 6/2000 | Feeney et al. |
| 6,073,215 A | 6/2000 | Snyder |
| 6,079,008 A | 6/2000 | Clery, III |
| 6,085,215 A | 7/2000 | Ramakrishnan et al. |
| 6,085,217 A | 7/2000 | Ault et al. |
| 6,085,294 A | 7/2000 | Van Doren et al. |
| 6,092,127 A | 7/2000 | Tausheck |
| 6,092,158 A | 7/2000 | Harriman et al. |
| 6,112,016 A | 8/2000 | MacWilliams et al. |
| 6,134,665 A | 10/2000 | Klein et al. |
| 6,141,689 A | 10/2000 | Yasrebi |
| 6,141,765 A | 10/2000 | Sherman |
| 6,144,669 A | 11/2000 | Williams et al. |
| 6,145,054 A | 11/2000 | Mehrotra et al. |
| 6,157,955 A | 12/2000 | Narad et al. |
| 6,160,562 A | 12/2000 | Chin et al. |
| 6,182,177 B1 | 1/2001 | Harriman |
| 6,195,676 B1 | 2/2001 | Spix et al. |
| 6,199,133 B1 | 3/2001 | Schnell |
| 6,201,807 B1 | 3/2001 | Prasanna |
| 6,212,542 B1 | 4/2001 | Kahle et al. |
| 6,212,611 B1 | 4/2001 | Nizar et al. |
| 6,216,220 B1 | 4/2001 | Hwang |
| 6,223,207 B1 | 4/2001 | Lucovsky et al. |
| 6,223,238 B1 | 4/2001 | Meyer et al. |
| 6,223,279 B1 | 4/2001 | Nishimura et al. |
| 6,247,025 B1 | 6/2001 | Bacon |
| 6,256,713 B1 | 7/2001 | Audityan et al. |
| 6,272,616 B1 | 8/2001 | Fernando et al. |
| 6,275,505 B1 | 8/2001 | O'Loughlin et al. |
| 6,279,113 B1 | 8/2001 | Vaidya |
| 6,289,011 B1 | 9/2001 | Seo et al. |
| 6,298,370 B1 | 10/2001 | Tang et al. |
| 6,307,789 B1 | 10/2001 | Wolrich et al. |
| 6,320,861 B1 | 11/2001 | Adam et al. |
| 6,324,624 B1 | 11/2001 | Wolrich et al. |
| 6,345,334 B1 | 2/2002 | Nakagawa et al. |
| 6,347,341 B1 | 2/2002 | Glassen et al. |
| 6,347,344 B1 | 2/2002 | Baker et al. |
| 6,351,474 B1 | 2/2002 | Robinett et al. |
| 6,356,962 B1 | 3/2002 | Kasper |
| 6,359,911 B1 | 3/2002 | Movshovich et al. |

| | | | |
|---|---|---|---|
| 6,360,262 B1 | 3/2002 | Guenthner et al. | |
| 6,373,848 B1 | 4/2002 | Allison et al. | |
| 6,385,658 B2 | 5/2002 | Harter, Jr. et al. | |
| 6,389,449 B1 | 5/2002 | Nemirovsky et al. | |
| 6,393,483 B1 | 5/2002 | Latif et al. | |
| 6,393,531 B1 | 5/2002 | Novak et al. | |
| 6,415,338 B1 | 7/2002 | Habot | |
| 6,426,940 B1 | 7/2002 | Seo et al. | |
| 6,426,957 B1 | 7/2002 | Hauser et al. | |
| 6,427,196 B1 | 7/2002 | Adiletta et al. | |
| 6,430,626 B1 | 8/2002 | Witkowski et al. | |
| 6,434,145 B1 | 8/2002 | Opsasnick et al. | |
| 6,438,651 B1 | 8/2002 | Slane | |
| 6,463,072 B1 | 10/2002 | Wolrich et al. | |
| 6,470,415 B1 | 10/2002 | Starr et al. | |
| 6,522,188 B1 | 2/2003 | Poole | |
| 6,523,060 B1 | 2/2003 | Kao | |
| 6,532,509 B1 | 3/2003 | Wolrich et al. | |
| 6,539,024 B1 * | 3/2003 | Janoska et al. | 370/412 |
| 6,552,826 B2 | 4/2003 | Adler et al. | |
| 6,560,667 B1 | 5/2003 | Wolrich et al. | |
| 6,577,542 B2 | 6/2003 | Wolrich et al. | |
| 6,584,522 B1 | 6/2003 | Wolrich et al. | |
| 6,587,906 B2 | 7/2003 | Wolrich et al. | |
| 6,606,704 B1 | 8/2003 | Adiletta et al. | |
| 6,625,654 B1 | 9/2003 | Wolrich et al. | |
| 6,631,430 B1 | 10/2003 | Wolrich et al. | |
| 6,631,462 B1 | 10/2003 | Wolrich et al. | |
| 6,658,546 B2 | 12/2003 | Calvignac et al. | |
| 6,661,794 B1 | 12/2003 | Wolrich et al. | |
| 6,667,920 B2 | 12/2003 | Wolrich et al. | |
| 6,668,317 B1 | 12/2003 | Bernstein et al. | |
| 6,681,300 B2 | 1/2004 | Wolrich et al. | |
| 6,684,303 B2 | 1/2004 | LaBerge | |
| 6,687,247 B1 | 2/2004 | Wilford et al. | |
| 6,694,380 B1 | 2/2004 | Wolrich et al. | |
| 6,724,721 B1 | 4/2004 | Cheriton | |
| 6,731,596 B1 | 5/2004 | Chiang et al. | |
| 6,754,223 B1 | 6/2004 | Lussier et al. | |
| 6,757,791 B1 | 6/2004 | O'Grady et al. | |
| 6,768,717 B1 | 7/2004 | Reynolds et al. | |
| 6,779,084 B2 | 8/2004 | Wolrich et al. | |
| 6,791,989 B1 | 9/2004 | Steinmetz et al. | |
| 6,795,447 B2 | 9/2004 | Kadambi et al. | |
| 6,804,239 B1 | 10/2004 | Lussier et al. | |
| 6,810,426 B2 | 10/2004 | Mysore et al. | |
| 6,813,249 B1 | 11/2004 | Lauffenburger et al. | |
| 6,816,498 B1 | 11/2004 | Viswanath | |
| 6,822,958 B1 | 11/2004 | Branth et al. | |
| 6,822,959 B2 | 11/2004 | Galbi et al. | |
| 6,839,748 B1 | 1/2005 | Allavarpu et al. | |
| 6,842,457 B1 | 1/2005 | Malalur | |
| 6,850,999 B1 | 2/2005 | Mak et al. | |
| 6,868,087 B1 | 3/2005 | Agarwala et al. | |
| 6,888,830 B1 | 5/2005 | Snyder II et al. | |
| 6,975,637 B1 | 12/2005 | Lenell | |
| 2001/0014100 A1 | 8/2001 | Abe et al. | |
| 2002/0131443 A1 | 9/2002 | Robinett et al. | |
| 2002/0144006 A1 | 10/2002 | Cranston et al. | |
| 2002/0196778 A1 | 12/2002 | Colmant et al. | |
| 2003/0041216 A1 * | 2/2003 | Rosenbluth et al. | 711/141 |
| 2003/0046488 A1 * | 3/2003 | Rosenbluth et al. | 711/108 |
| 2003/0110166 A1 * | 6/2003 | Wolrich et al. | 707/3 |
| 2003/0115347 A1 * | 6/2003 | Wolrich et al. | 709/230 |
| 2003/0115426 A1 * | 6/2003 | Rosenbluth et al. | 711/154 |
| 2003/0131022 A1 | 7/2003 | Wolrich et al. | |
| 2003/0131198 A1 | 7/2003 | Wolrich et al. | |
| 2003/0140196 A1 | 7/2003 | Wolrich et al. | |
| 2003/0145159 A1 | 7/2003 | Adiletta et al. | |
| 2003/0147409 A1 | 8/2003 | Wolrich et al. | |
| 2004/0039895 A1 | 2/2004 | Wolrich et al. | |
| 2004/0054880 A1 | 3/2004 | Bernstein et al. | |
| 2004/0071152 A1 | 4/2004 | Wolrich et al. | |
| 2004/0073728 A1 | 4/2004 | Wolrich et al. | |
| 2004/0073778 A1 | 4/2004 | Adiletta et al. | |
| 2004/0098496 A1 | 5/2004 | Wolrich et al. | |
| 2004/0109369 A1 | 6/2004 | Wolrich et al. | |
| 2004/0179533 A1 | 9/2004 | Donovan | |

OTHER PUBLICATIONS

U.S. Appl. No. 09/475,614, filed Dec. 30, 1999, Wolrich et al.

Byrd et al., "Multithread Processor Architectures," *IEEE Spectrum*, vol. 32, No. 8, New York, Aug. 1, 1995, pp. 38–46.

Doyle et al., *Microsoft Press Computer Dictionary*, $2^{nd}$ ed., Microsoft Press, Redmond, Washington, USA, 1994, p. 326.

Fillo et al., "The M–Machine Multicomputer," IEEE Proceedings of MICRO–28, 1995, pp. 146–156.

Gomez et al., "Efficient Multithreaded User–Space Transport for Network Computing: Design and Test of the TRAP Protocol," *Journal of Parallel and Distributed Computing*, Academic Press, Duluth, Minnesota, USA, vol. 40, No. 1, Jan. 10, 1997, pp. 103–117.

Haug et al., "Reconfigurable hardware as shared resource for parallel threads," IEEE Symposium on FPGAs for Custom Computing Machines, 1998.

Hauser et al., "Garp: a MIPS processor with a reconfigurable coprocessor," Proceedings of the $5^{th}$ Annual IEEE Symposium on Field–Programmable Custom Computing Machines, 1997.

Hyde, R., "Overview of Memory Management," *Byte*, vol. 13, No. 4, 1998, pp. 219–225.

Litch et al., "StrongARMing Portable Communications," IEEE Mirco, 1998, pp. 48–55.

Schmidt et al., "The Performance of Alternative Threading Architectures for Parallel Communication Subsystems," *Internet Document, Online*!, Nov. 13, 1998.

Thistle et al., "A Processor Architecture for Horizon," IEEE, 1998, pp. 35–41.

Tremblay et al., "A Three Dimensional Register File for Superscalar Processors," IEEE Proceedings of the $28^{th}$ Annual Hawaii International Conference on System Sciences, 1995, pp. 191–201.

Trimberger et al, "A time–multiplexed FPGA," Proceedings of the $5^{th}$ Annual IEEE Symposium on Field–Programmable Custom Computing Machines, 1998.

Turner et al., "Design of a High Performance Active Router," Internet Document, *Online*, Mar. 18, 1999.

Vibhatavanijt et al., "Simultaneous Multithreading–Based Routers," Proceedings of the 2000 International Conference of Parallel Processing, Toronto, Ontario, Canada, Aug. 21–24, 2000, pp. 362–359.

Wazlowski et al., "PRSIM–II computer and architecture," IEEE Proceedings, Workshop on FPGAs for Custom Computing Machines, 1993.

Brewer, et al., "Remote Queues: Exposing Message Queues for Optimization and Atomicity", *SPAA '95* Santa Barbara, CA, pp. 1–13, Jun. 1995.

Jonkers, H., "Queueing Models of Shared–Memory Parallel Applications", *Computer and Telecommunications Systems Performance Engineering* (M.E. Woodward, S. Datta and S. Szumko, eds.), London: Pentech Press, 1994, pp. 129–140. ISBN 0–7273–0319–8.

Kumar, S., et al., "A Scalable, Cache–Based Queue Management Subsystem for Network Processors", *Proceedings of the ASPLOS–XI Workshop on Building Block Engine Architectures for Computers and Networks* (BEACON), Boston, MA, Oct. 2004, 7 pages.

Lymar T.Y., Sokolinsky L.B., "Data Streams Organization in Query Executor for Parallel DBMS", *Proceedings of the 4th IEEE International Baltic Workshop,* Lithuania, Vilnius, May 1–5, 2000. –Vilnius: Technica. 2000. vol. 1. P. 85–88.

McLuckie, L., et al., "Using the RapidIO Messaging Unit on PowerQUICC III", *Freescale Semiconductor, Inc.,* Aug. 2004 Rev. 1, pp. 1–19.

Pan, H., et al., "Heads and Tails: A Variable–Length Instruction Format Supporting Parallel Fetch and Decode", *CASES'01,* Nov. 16–17, 2001, 8 pages.

Adiletta, et al., "The next generation of Intel IXP Network Processors", Intel Technology Journal, Network Processors, vol. 6, issue 3, published Aug. 15, 2002, pp. 6–18.

Buyuktosunoglu, A., et al., "Tradeoffs in Power–Efficient Issue Queue Design", ISLPED '02, ACM, Aug. 2002, 6 pages.

Dandamudi, S., "Multiprocessors", IEEE Computer, Mar. 1997, pp. 82–89.

Hendler, D., et al., "Work Dealing", SPAA, '02, ACM, Aug. 2002, pp. 164–172.

Kornaros, et al., "A Fully–Programmable Memory Management System Optimizing Queue Handling at Multi Gigabit Rates", ACM, Jun. 2–6, 2003, pp. 54–59.

Michael, M., "Scalable Lock–Free Dynamic Memory Allocation", PLDI '04, ACM, Jun. 2004, pp. 1–12.

Scott, M., "Non–Blocking Timeout in Scalable Queue–Based Spin Locks", PODC '02, ACM, Jul. 2002, pp. 31–40.

* cited by examiner

QUEUE ARRAY CACHING IN NETWORK DEVICES

BACKGROUND

This invention relates to queue arrays for use in network devices.

Network devices such as routers and switches can have line speeds that can be faster than 10 Gigabits. For maximum efficiency the network device should be able to process data packets, storing them to and retrieving them from memory at a rate at least equal to the line rate. However, current network devices may lack the necessary speed to process data packets at the line speeds.

DETAILED DESCRIPTION

Figure 1:
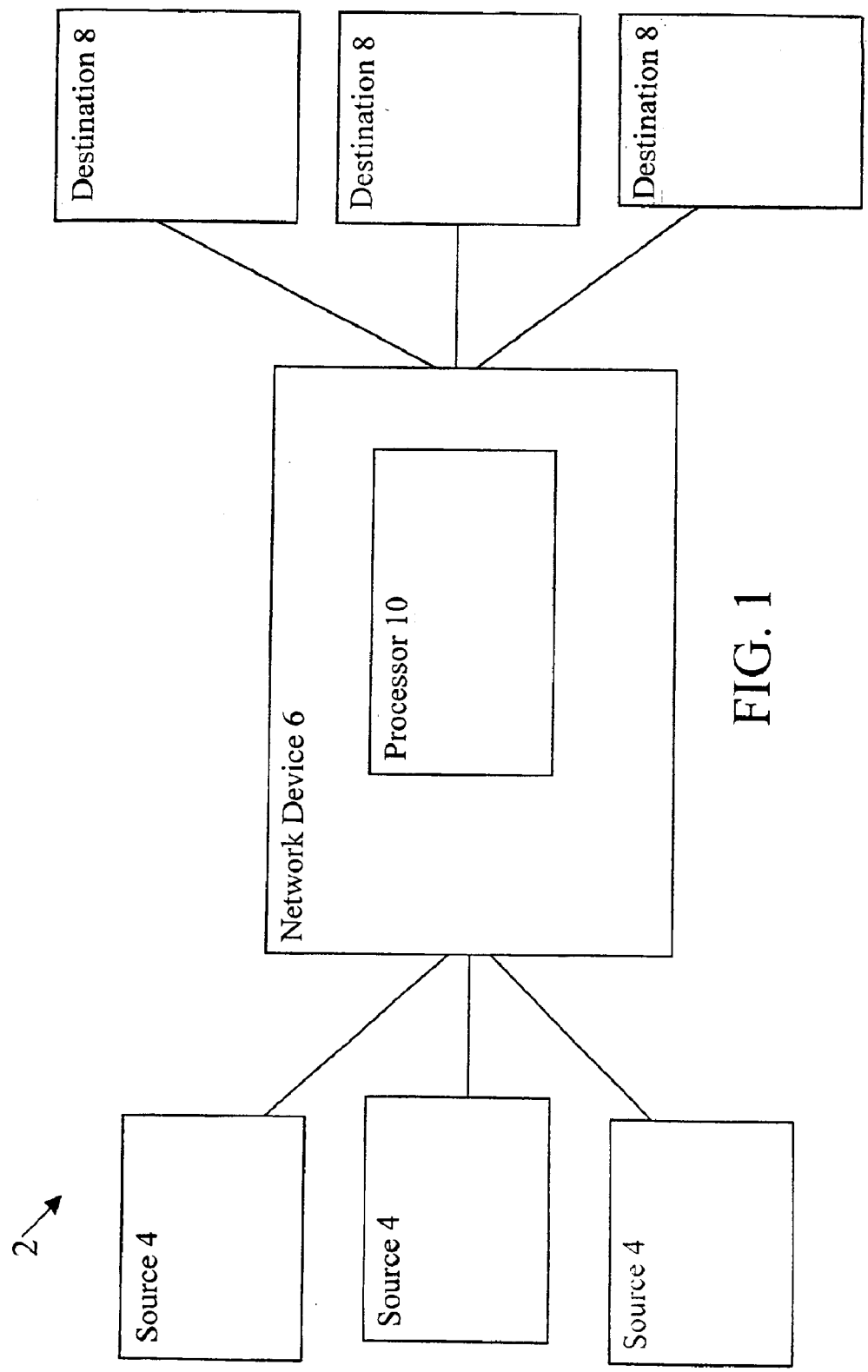
FIG. 1 is a block diagram of a network system.

Referring to FIG. 1, a network system 2 for processing data packets includes one or more sources 4 of data packets coupled to a network device 6 and one or more destinations 8 for the data packets. Each source 4 can include other network devices connected over a communications path operating at high data packet transfer line speeds. Examples of such communications paths include an optical carrier (OC)-192 line, and a 10-Gigabit line. Likewise, the destinations 8 also can include other network devices, as well as a similar network connection.

The network device 6 includes a processor 10 that uses a memory (not shown) storing memory data structures. The processor executes instructions and operates with the memory data structures as configured to receive, store and forward the data packets to a specified destination. The network device 6 can be part of, a network switch or a network router and so forth. The processor 10 also includes one or more programming engines. The programming engine ("PE") includes a sixteen-entry content addressable memory ("CAM"). The CAM tracks, which of its entries is the least-recently-used ("LRU").

Figure 2:
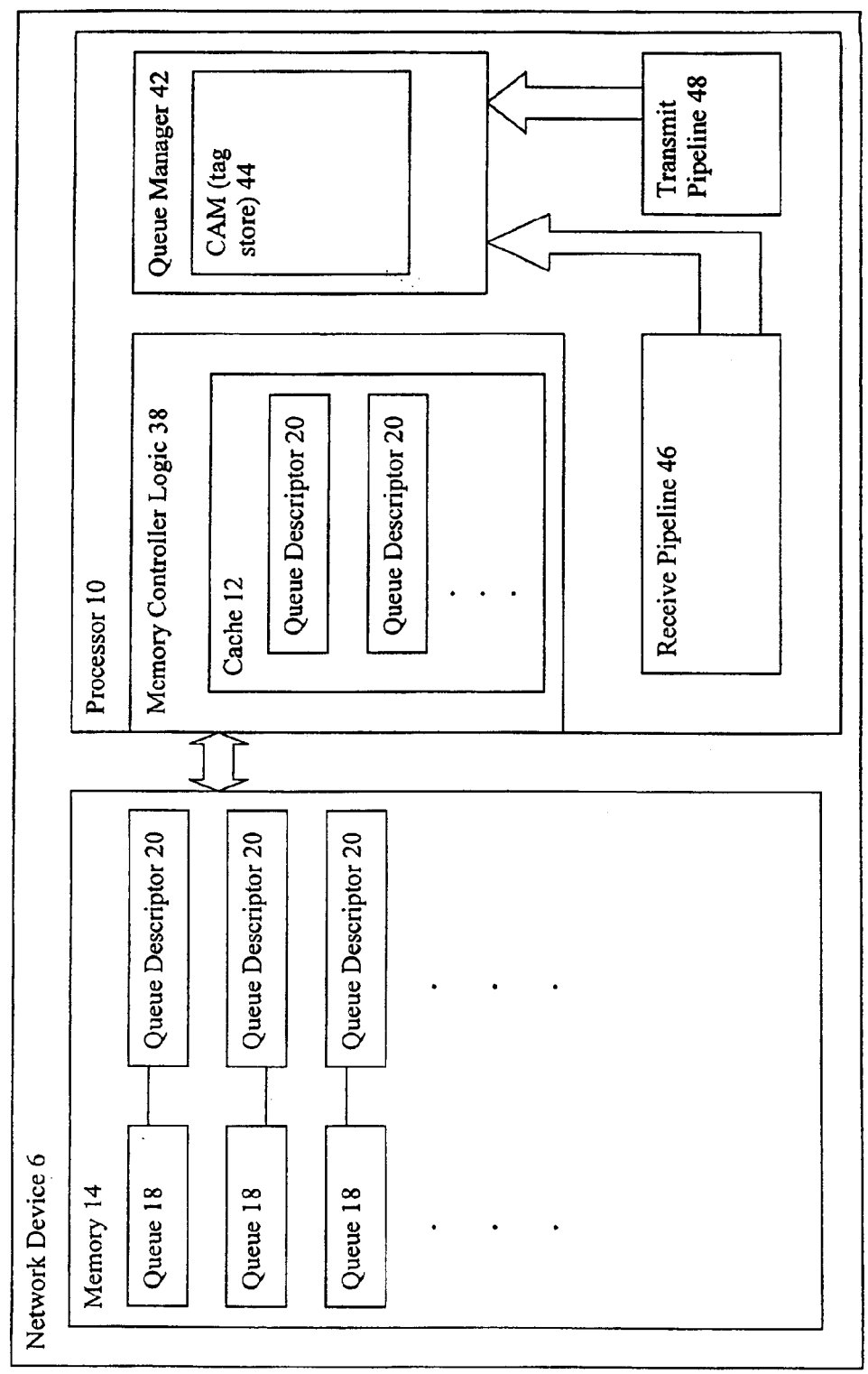
FIG. 2 is a block diagram of a network device.

Referring to FIG. 2, the network device 6 includes memory 14 coupled to the processor 10. The memory 14 stores output queues 18 and their corresponding queue descriptors 20. The processor 10 includes memory controller logic 38 that includes a cache 12 to store some of the queue descriptors 20 as described below. The processor 10 also has a queue manager 42 that can be implemented as a programming engine. A CAM 44 serves as a tag store holding the addresses of queue descriptors 20 that are stored in the cache.

The queue manager 42 receives enqueue requests from a set of programming engines that function as a receive pipeline 46. The receive pipeline 46 is programmed to process and classify data packets received by the network device 6 from sources 4 (FIG. 1). The enqueue requests specify which output queue 18 an arriving packet should be added to. Another programming engine functions as a transmit scheduler 48 to send dequeue requests to the queue manager 42. The dequeue requests specify the output queue 18 from which a packet is to be removed for transmittal to a destination 8 (FIG. 1).

An enqueue operation adds information that arrived in a data packet to one of the output queues 18 and updates the corresponding queue descriptor 20. A dequeue operation removes information from one of the output queues 18 and updates the corresponding queue descriptor 20, to allow the network device 6 to transmit the information to the appropriate destination 8.

Figure 3:
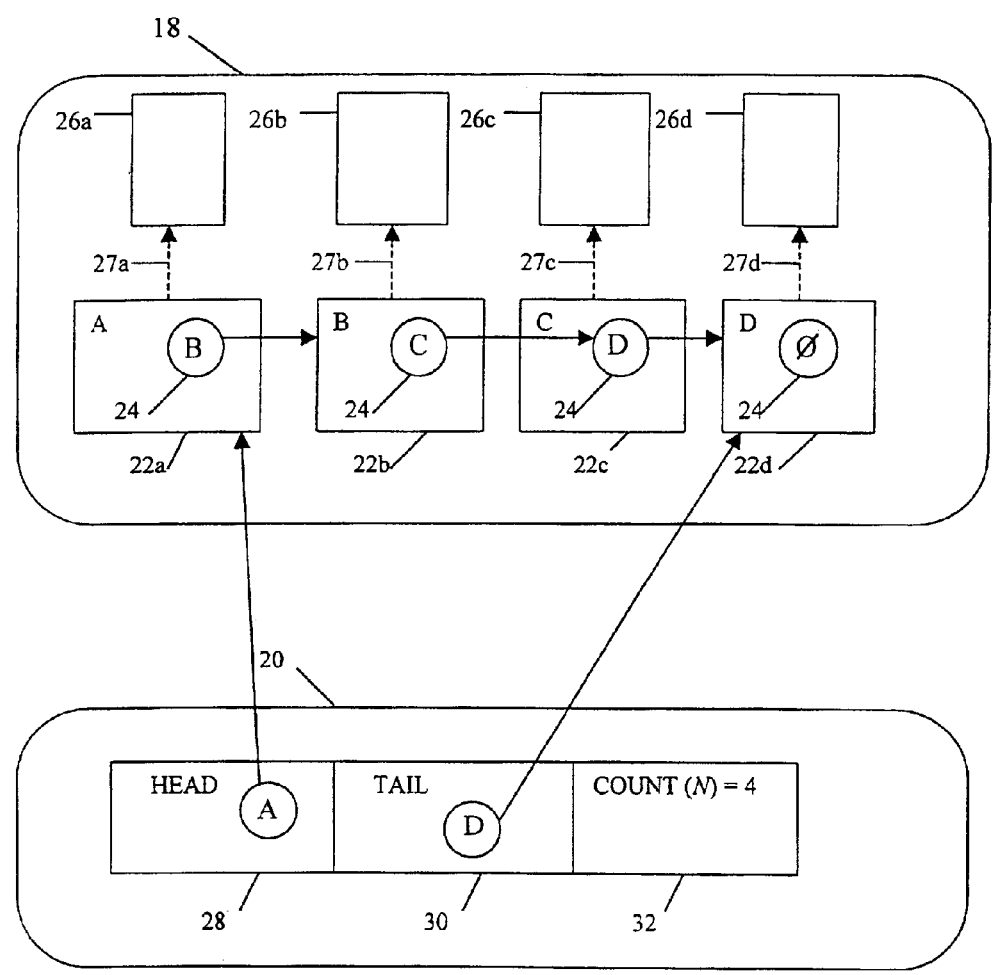
FIG. 3 shows a queue and queue descriptor.

An example of an output queue 18 and its corresponding queue descriptor 20 is shown in FIG. 3. The output queue 18 includes a linked list of elements 22, each of which contains a pointer 24 to the next element 22 in the output queue 18. The pointer 26 of the last element 22 in the queue 18 contains a null value. A function of the address of each element 22 implicitly maps to the information 26 stored in the memory 14 that the element 22 represents. For example, the first element 22a of output queue 18 shown in FIG. 3 is located at address A. The location in memory of the information 26a that element 22a represents is implicit from the element's address A, illustrated by dashed arrow 27a. Element 22a contains the address B, which serves as a pointer 24 to the next element 22b in the output queue 18, located at address B.

The queue descriptor 20 includes a head pointer 28, a tail pointer 30 and a count 32. The head pointer 28 points to the first element 22 of the output queue 18, and the tail pointer 30 points to the last element 22 of the output queue 18. The count 32 identifies the number (N) of elements 22 in the output queue 18.

Executing enqueue and dequeue operations for a large number of queues 18 in the memory 14 at high-bandwidth line rates can be accomplished by storing some of the queue descriptors 20 in the cache 12 (FIG. 2). The queue manager 42 implements a software-controlled tag store in its CAM 44 to identify the addresses in memory 14 of the sixteen queue descriptors 20 most-recently-used in enqueue or dequeue operations. The cache 12 stores the corresponding queue descriptors 20 (the head pointer 28, tail pointer 30 and count 32) stored at the addresses identified in the tag store 44.

The queue manager 42 issues commands to return queue descriptors 20 to memory 14 and fetch new queue descriptors from memory such that the queue descriptors stored in the cache 12 remain coherent with the addresses in the tag store 44. The queue manager 42 also issues commands to the memory controller logic 38 to indicate which queue descriptor 18 in the cache 12 should be used to execute the command. The commands that reference the head pointer 28 or tail pointer 30 (see FIG. 3) of a queue descriptor 20 in the cache 12 are executed in the order in which they arrive at the memory controller 38.

Figure 4:
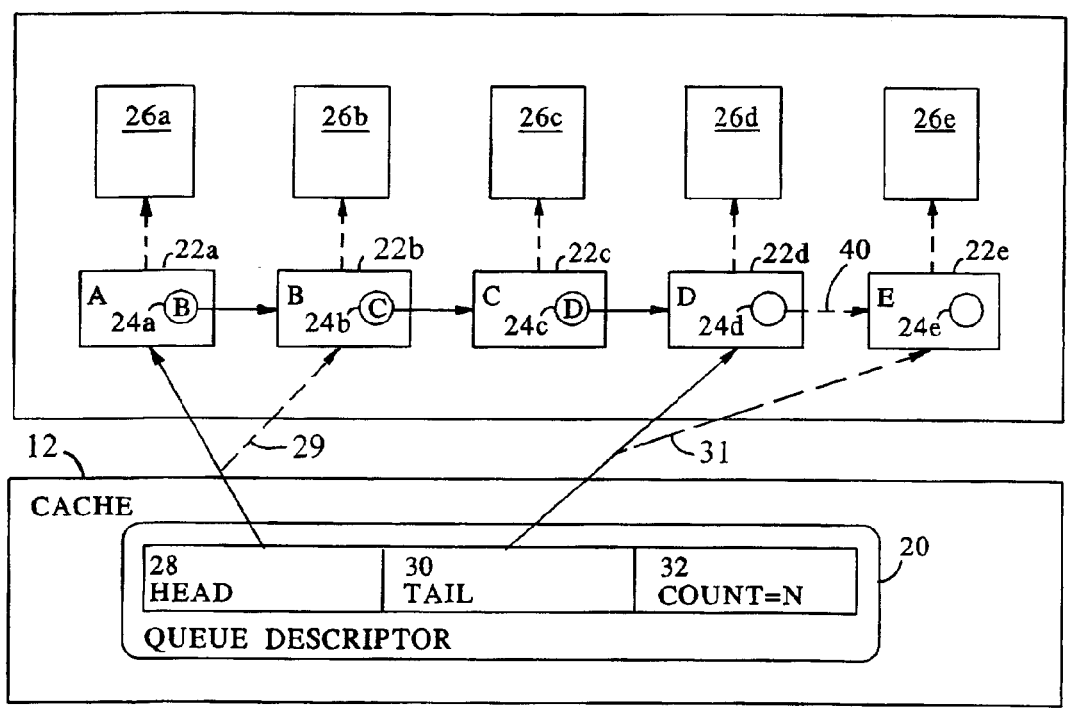
FIG. 4 illustrates an enqueue and a dequeue operation.

Referring to FIG. 4, when performing an enqueue operation, the address in memory 14 of a new element 22e to be added to the queue 18 is stored (as indicated by dashed line 40) in the pointer 24d of the element 22d that currently is at the address indicated by the tail pointer 30 for that queue. The address of the new element 22e address then is stored in the tail pointer 30 of the corresponding queue descriptor 20 in the cache 12, as indicated by dashed line 31. Because only a single write operation to memory 14 is required for an enqueue operation, only two cycles are required to update the cache 12. Subsequent enqueue operations to the same queue 18 then can be initiated.

For dequeue operations, the address contained in the head pointer 28 is returned to the queue manager 42 (FIG. 2) to indicate (by implicit mapping) the location in memory 14 of the information 26e to be sent to a specified destination device 8 (FIG. 1). The pointer 24a in the element 22a is read to obtain the address of the next element 22b in the queue 18. The address of next element 22b is written to the head pointer of the corresponding queue descriptor 20 in the cache 12 (indicated by dashed line 29). Subsequent dequeue operations to the same queue 18 are delayed until the head pointer 28 in the cache 12 is updated. However, so long as the element 22 being read is not the only element in the queue 18, an enqueue operation with respect to the queue 18 can proceed even if a dequeue operation is in progress because the tail pointer 30 is not affected by the dequeue operation.

An advantage of locating the cache 12 of queue descriptors 20 at the memory controller logic 38 includes allowing for low latency access to and from the cache 12 and the memory 14. Also, having the control structure for queue operations in a programming engine can allow for flexible high performance while using existing micro-engine hardware.

Various features of the system can be implemented in hardware, software or a combination of hardware and software. For example, some aspects of the system can be implemented in computer programs executing on programmable computers. Each program can be implemented in a high level procedural or object-oriented programming language to communicate with a computer system. Furthermore, each such computer program can be stored on a storage medium, such as read only memory (ROM) readable by a general or special purpose programmable computer, for configuring and operating the computer when the storage medium is read by the computer to perform the functions described above.

Other implementations are within the scope of the following claims.

What is claimed is:

1. A method executed in a processor comprising:
   storing queue descriptors in a memory, the queue descriptors each specifying a structure of a respective queue, the queue including a linked list of elements and the queue descriptor including a head pointer, a tail pointer, and a count;
   determining, according to a criterion, which of the queue descriptors stored in the memory were most recently accessed, thereby generating a determined subset;
   storing the determined subset of queue descriptors in a cache in a processor's memory controller logic, the determined subset of queue descriptors stored in the cache including less than all of the queue descriptors stored in the memory with the queue descriptors that are stored in the memory, but not included in the determined subset, not being stored in the cache;
   receiving a request to perform an enqueue or a dequeue operation with respect to a particular queue; and
   referencing a corresponding queue descriptor stored in the cache to execute the operation, the queue descriptor specifying a structure of the particular queue.

2. The method of claim 1 further comprising:
   maintaining a list of addresses of a subset of queue descriptors stored in the cache.

3. The method of claim 2 further comprising:
   storing in the cache a queue descriptor corresponding to each address in the list.

4. The method of claim 3 further comprising:
   tracking an address stored in the content addressable memory, the address corresponding to a queue descriptor that was least recently used for an enqueue or dequeue operation.

5. The method of claim 4 further comprising:
   removing the least-recently-used address from the list if the list lacks an entry corresponding to the queue specified by the request; and
   replacing the removed address with an address corresponding to the specified queue.

6. The method of claim 3 further comprising:
   issuing commands to the memory controller logic to return and fetch queue descriptors to and from the memory to maintain coherence between the queue descriptors in the cache and the list of addresses in the content addressable memory.

7. The method of claim 6 further comprising:
   modifying the queue descriptor referenced by the enqueue or dequeue operation; and
   returning the modified queue descriptors to memory from the cache.

8. The method of claim 1 further comprising:
   executing an enqueue operation without waiting for completion of a previous dequeue operation.

9. An apparatus comprising:
   a memory to store queue descriptors, each of which specifies a structure of a respective queue, the queue including a linked list of elements and the queue descriptor including a head pointer, a tail pointer, and a count;
   a network processor coupled to the memory further comprising:
   memory controller logic that includes a cache to store a subset of the queue descriptors in the memory, the subset determined based on which of the queue descriptors stored in the memory were most recently accessed, and the determined subset of queue descriptors stored in the cache including less than all of the queue descriptors stored in the memory with the queue descriptors that are stored in the memory, but not included in the determined subset, not being stored in the cache; and
   a programming engine that accesses a list of addresses in the memory corresponding to the queue descriptors stored in the cache; and
   wherein the processor is configured to reference a corresponding queue descriptor in the cache in response to a request to perform an enqueue or a dequeue operation with respect to a particular queue.

10. The apparatus of claim 9 wherein the programming engine includes a content addressable memory to store the list of addresses.

11. The apparatus of claim 10 wherein the content addressable memory is configured to track which address in the list was least recently used by the processor for an enqueue or dequeue operation.

12. The apparatus of claim 9 wherein the programming engine is configured to:
   remove the least-recently-used address from its list of addresses if the list lacks an entry corresponding to the queue specified by the request; and
   replace the removed address with an address corresponding to the specified queue.

13. The apparatus of claim 9 wherein the programming engine is configured to issue commands to the memory controller logic to return and fetch queue descriptors to and from memory to maintain coherence between the queue descriptors in the cache and the list of addresses in the programming engine.

14. The apparatus of claim 9 wherein the processor is configured to return to memory from the cache a queue descriptor modified by an enqueue or dequeue operation.

15. The apparatus of claim 9 wherein the processor is configured to execute an enqueue operation without waiting for completion of a previous dequeue operation if the queue would otherwise be unempty upon completion of the dequeue operation.

16. An article comprising a computer-readable medium that stores computer-executable instructions for causing a computer system to:
store queue descriptors in a memory, the queue descriptors each specifying a structure of a respective queue, the queue including a linked list of elements and the queue descriptor including a head pointer, a tail pointer, and a count;
determine which of the queue descriptors stored in the memory were most recently accessed according to a criterion, thereby generating a determined subset,
store the determined subset of queue descriptors in a cache in a processor's memory controller logic, the determined subset of queue descriptors stored in the cache including less than all of the queue descriptors stored in the memory with the queue descriptors that are stored in the memory, but not included in the determined subset, not being stored in the cache; and
reference a queue descriptor stored in a cache in a processor's memory controller logic, the cache including a subset of the queue descriptors, in response to receiving a request to perform an enqueue or dequeue operation with respect to a particular queue, the queue descriptor specifying the structure of the queue.

17. The article of claim 16 comprising instructions for causing the computer system to:
maintain in a content addressable memory a list of addresses of a subset of queue descriptors stored in a memory.

18. The article of claim 17 comprising instructions for causing the computer system to:
store in the cache a queue descriptor corresponding to each address in the list.

19. The article of claim 18 comprising instructions for causing the computer system to:
track an address in the content addressable memory, the address corresponding to a queue descriptor that was least recently used for an enqueue or dequeue operation.

20. The article of claim 19 comprising instructions for causing the computer system to:
remove the least-recently-used address from the list if the list lacks an entry corresponding to the queue specified by the request; and
replace the removed address with an address corresponding to the specified queue.

21. The article of claim 18 comprising instructions for causing the computer system to:
issue commands to the memory controller logic to return and fetch queue descriptors to and from the memory to maintain coherence between the queue descriptors in the cache and the list of addresses in the content addressable memory.

22. The article of claim 21 comprising instructions for causing the computer system to:
return a queue descriptor modified by an enqueue or dequeue operation from the cache to memory.

23. The article of claim 16 comprising instructions for causing a computer system to:
execute an enqueue operation without waiting for completion of a previous dequeue operation if the queue would otherwise be unempty upon completion of the dequeue operation.

24. A system, comprising:
multiple engines integrated onto a single die;
a memory;
a cache;
a memory controller communicatively coupled to the multiple engines, the memory controller having memory logic to manage the cache and including instructions to cause the system to;
store queue descriptors in the memory, the queue descriptors each specifying a structure of a respective queue, the queue including a linked list of elements and the queue descriptor including a head pointer, a tail pointer, and a count;
determine which of the queue descriptors stored in the memory were most recently accessed according to a criterion,
store the determined subset of queue descriptors in the cache, the determined subset of queue descriptors stored in the cache including less than all of the queue descriptors stored in the memory with the queue descriptors that are stored in the memory, but not included in the determined subset, not being stored in the cache; and
reference a queue descriptor stored in the cache, the cache including a subset of the queue descriptors, in response to receiving a request to perform an enqueue or dequeue operation with respect to a particular queue, the queue descriptor specifying the structure of the queue.

25. The system of claim 24 wherein the memory controller further comprises comprising instructions to cause the system to:
store in the cache a queue descriptor corresponding to each address in the list.

26. The system of claim 24 wherein the memory controller further comprises comprising instructions to cause the system to:
track an address in the content addressable memory, the address corresponding to a queue descriptor that was least recently used for an enqueue or dequeue operation.

27. The system of claim 24 wherein the memory controller further comprises comprising instructions to cause the system to:
remove the least-recently-used address from the list if the list lacks an entry corresponding to the queue specified by the request; and
replace the removed address with an address corresponding to the specified queue.

28. The system of claim 27 wherein the memory controller further comprises comprising instructions to cause the system to:
issue commands to the memory controller logic to return and fetch queue descriptors to and from the memory to maintain coherence between the queue descriptors in the cache and the list of addresses in the content addressable memory.

29. The system of claim 27 wherein the memory controller further comprises comprising instructions to cause the system to:

return a queue descriptor modified by an enqueue or dequeue operation from the cache to memory.

30. The system of claim 24 wherein the memory controller further comprises comprising instructions to cause the system to:

execute an enqueue operation without waiting for completion of a previous dequeue operation if the queue would otherwise be unempty upon completion of the dequeue operation.

* * * * *